United States Patent
Fine (10) Patent No.: US 9,729,201 B2
(45) Date of Patent: Aug. 8, 2017

(54) BROADCASTING A MESSAGE USING MODULATED POWER

(71) Applicant: EMPIRE TECHNOLOGY DEVELOPMENT LLC, Wilmington, DE (US)

(72) Inventor: Kevin S. Fine, Yverdon-les-Bains (CH)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 209 days.

(21) Appl. No.: 14/405,084

(22) PCT Filed: Apr. 24, 2014

(86) PCT No.: PCT/US2014/035301
§ 371 (c)(1),
(2) Date: Dec. 2, 2014

(87) PCT Pub. No.: WO2015/163886
PCT Pub. Date: Oct. 29, 2015

(65) Prior Publication Data
US 2016/0285515 A1 Sep. 29, 2016

(51) Int. Cl.
H04B 5/00 (2006.01)
H04W 4/06 (2009.01)
H04L 29/06 (2006.01)

(52) U.S. Cl.
CPC ......... *H04B 5/0031* (2013.01); *H04B 5/0037* (2013.01); *H04B 5/0093* (2013.01); *H04L 65/4076* (2013.01); *H04W 4/06* (2013.01)

(58) Field of Classification Search
CPC .... H04B 5/0075; H04B 5/0081; H04B 17/27; H04B 5/0043; H04B 5/0031; H04B 5/0037; H04B 5/0093; H04L 25/05
(Continued)

(56) References Cited

U.S. PATENT DOCUMENTS 4,419,758 A 12/1983 Dorey
6,154,488 A 11/2000 Hunt
(Continued)

OTHER PUBLICATIONS

"Earth's Magnetic Field," Retrieved from the Internet URL: http://web.archive.org/web/20140412165948/http:// en.wikipedia.org/wiki/Earth%27s_magnetic_field on Sep. 24, 2014, pp. 1-17.
(Continued)

*Primary Examiner* — Emmanuel Bayard
(74) *Attorney, Agent, or Firm* — Moritt Hock & Hamroff LLP; Steven S. Rubin, Esq.

(57) ABSTRACT

Technologies are generally described for methods and systems effective to broadcast a message. In some examples, the methods may include receiving the message at a modulator. The modulator may receive a power signal configured to provide power to a closed conductive loop. The modulator may modulate the power signal using the message to generate a modulated power signal. The modulator may broadcast the message by sending the modulated power signal through the closed conductive loop. The modulated power signal, when passing through the closed conductive loop, may produce a modulated magnetic wave that includes an indication of the message. A receiver may be configured to detect the modulated magnetic wave from the closed conductive loop. The receiver may be configured to convert the modulated magnetic wave into the modulated power signal. The receiver may be configured to demodulate the modulated power signal to reproduce the message.

20 Claims, 6 Drawing Sheets

(58) Field of Classification Search
USPC .................................. 375/258, 295, 257
See application file for complete search history.

(56) References Cited

U.S. PATENT DOCUMENTS

| | | | | |
|---|---|---|---|---|
| 6,943,680 | B2* | 9/2005 | Ward, Jr. | G06K 7/10336 340/10.1 |
| 6,948,344 | B2* | 9/2005 | Janssen | E05B 19/04 70/278.3 |
| 6,956,509 | B2* | 10/2005 | Shanks | G06K 7/0008 340/10.2 |
| 6,958,551 | B2* | 10/2005 | Janssen | B60R 25/04 307/10.3 |
| 6,961,005 | B2* | 11/2005 | Clement | H01H 9/167 200/50.26 |
| 6,962,293 | B2* | 11/2005 | Kim | G06K 19/0723 235/441 |
| 6,989,750 | B2* | 1/2006 | Shanks | G06K 7/0008 340/572.1 |
| 7,009,496 | B2* | 3/2006 | Arneson | G06Q 10/08 235/377 |
| 7,014,112 | B2* | 3/2006 | deVos | G06K 19/0723 235/375 |
| 7,035,818 | B1* | 4/2006 | Bandy | G06K 7/0008 705/22 |
| 7,057,511 | B2* | 6/2006 | Shanks | G06K 7/0008 340/572.1 |
| 7,064,651 | B2* | 6/2006 | Goetz | B60R 25/24 307/10.3 |
| 7,075,436 | B2* | 7/2006 | Shanks | G06K 7/0008 340/10.3 |
| 7,102,523 | B2* | 9/2006 | Shanks | G06K 7/0008 340/572.1 |
| 7,145,451 | B2* | 12/2006 | Ward, Jr. | G06K 7/10336 340/10.1 |
| 7,145,482 | B2* | 12/2006 | Shanks | G06K 7/0008 340/572.1 |
| 7,180,421 | B2* | 2/2007 | Pahlaven | G06K 7/10306 340/572.1 |
| 7,183,788 | B2* | 2/2007 | Moore | G01R 31/2884 324/754.31 |
| 7,195,173 | B2* | 3/2007 | Powell | G06K 7/10049 235/375 |
| 7,199,716 | B2* | 4/2007 | Shanks | G06K 7/0008 340/572.1 |
| 7,212,125 | B2* | 5/2007 | Shanks | G06K 7/0008 340/572.1 |
| 7,253,717 | B2* | 8/2007 | Armstrong | G06K 7/0008 340/10.2 |
| 7,274,295 | B2* | 9/2007 | Koch | G06Q 10/08 235/385 |
| 7,321,296 | B2* | 1/2008 | Engellenner | G06Q 10/087 235/385 |
| 7,497,384 | B2* | 3/2009 | Powell | G06K 7/10049 235/486 |
| 7,518,267 | B2* | 4/2009 | Baarman | H01F 5/02 307/150 |
| 7,602,086 | B2* | 10/2009 | Okada | G03F 7/70725 310/12.06 |
| 7,604,178 | B2* | 10/2009 | Stewart | G06K 7/10039 235/492 |
| 7,612,652 | B2* | 11/2009 | Stewart | G06K 19/0705 340/10.1 |
| 7,626,488 | B2* | 12/2009 | Armstrong | G06K 7/0008 340/10.1 |
| 7,642,917 | B2* | 1/2010 | Tran | G06K 7/10336 340/572.1 |
| 7,793,839 | B2* | 9/2010 | Zosimadis | G06K 7/0008 235/451 |
| 7,800,554 | B2* | 9/2010 | Tucek | H01Q 1/36 343/702 |
| 7,808,367 | B2* | 10/2010 | Moore | G06K 7/10336 340/10.1 |
| 7,844,505 | B1* | 11/2010 | Arneson | G06Q 10/087 340/10.2 |
| 7,902,971 | B2* | 3/2011 | Engellenner | G06Q 10/087 235/385 |
| 7,928,843 | B2* | 4/2011 | Shanks | G06K 7/0008 340/10.1 |
| 7,965,189 | B2* | 6/2011 | Shanks | G06K 7/0008 340/572.1 |
| 8,026,819 | B2* | 9/2011 | August | G06K 19/07749 340/539.11 |
| 8,028,208 | B2* | 9/2011 | Moore | G01R 31/2884 714/724 |
| RE42,872 | E* | 10/2011 | Tuttle | G01R 31/01 324/605 |
| 8,125,316 | B2* | 2/2012 | Moore | G06K 7/10336 340/10.1 |
| 8,127,155 | B2* | 2/2012 | Baarman | G06F 1/1632 361/679.4 |
| 8,248,211 | B2* | 8/2012 | Bares | G06F 1/12 340/10.3 |
| 8,269,605 | B2* | 9/2012 | Moore | G06K 7/10336 340/10.1 |
| RE43,918 | E* | 1/2013 | Tuttle | G01R 31/01 324/605 |
| RE43,935 | E* | 1/2013 | Tuttle | G01R 31/01 324/605 |
| RE43,940 | E* | 1/2013 | Tuttle | G01R 31/01 324/605 |
| 8,378,789 | B2* | 2/2013 | Moore | G06K 7/10336 340/10.1 |
| 8,378,841 | B2* | 2/2013 | Stevens | G06Q 10/08 166/250.01 |
| 8,430,310 | B1 | 4/2013 | Ho et al. | |
| 8,548,098 | B2* | 10/2013 | Shyu | H04L 7/0087 375/324 |
| 8,674,809 | B2* | 3/2014 | Bares | G06F 1/12 340/10.3 |
| 8,681,000 | B2* | 3/2014 | August | A01K 11/004 340/572.1 |
| 8,727,880 | B2* | 5/2014 | Rebmann | G01D 5/2086 463/36 |
| 8,896,422 | B2* | 11/2014 | Koch | G06Q 10/08 340/10.1 |
| 2004/0101312 | A1 | 5/2004 | Cabrera | |
| 2005/0105394 | A1* | 5/2005 | Lee | G08B 21/24 367/128 |
| 2011/0275331 | A1 | 11/2011 | Wang et al. | |
| 2012/0288019 | A1* | 11/2012 | Okamura | H02J 5/005 375/259 |
| 2013/0332001 | A1 | 12/2013 | Parello et al. | |
| 2014/0285092 | A1* | 9/2014 | Knoedgen | H05B 37/0272 315/151 |

OTHER PUBLICATIONS

"Shannon-Hartley Theorem," Retrieved from the Internet URL: http://web.archive.org/web/20140222055013/http://en.wikipedia.org/wiki/Shannon%E2%80%93Hartley_theorem on Sep. 24, 2014, pp. 1-8.

Boyle, R. "Radio-Style System of Communication Via Magnetic Waves Demonstrated in Deep Mines," New technology to improve mine safety, posted Aug. 9, 2010, Retrieved from the Internet URL: http://goo.gl/BDZ6RI on Sep. 24, 2014, pp. 1-3.

Haselsteiner E. and Breitfuβ, K., "Security in near field communication (NFC)," Workshop on RFID Security RFIDSec, 2006, Retrieved from the Internet URL: http://web.archive.org/web/20130329234948/http://ece.wpi.edu/~dchasaki/papers/Security%20in%20NFC.pdf on Sep. 24, 2014, pp. 1-11.

International Search Report and Written Opinion for International Application No. PCT/IUS2014/035301 mailed on Sep. 9, 2014, 15 pages.

Jaskolski, C., "Magnetic Field Based Wireless for Communications and Sensing Through Barriers," ISA Passive Wireless Sensor Workshop Washington DC, May 22, 2013, pp. 1-12.

(56) References Cited

OTHER PUBLICATIONS

Morgan, Z., "SensorStudy," Retrieved from the Internet URL: https://itunes.apple.com/us/app/sensorstudy/id646245782?mt=8 on Sep. 24, 2014, pp. 1-2.
Sutterlin, P. and Downey, W., "A Power Line Communication Tutorial—Challenges and Technologies," Power Line Communication, 1998, pp. 1-17.

* cited by examiner

BROADCASTING A MESSAGE USING MODULATED POWER

CROSS REFERENCE TO RELATED APPLICATION

This application is a U.S. National Stage filing under 35 U.S.C. 371 of International Application No. PCT/US14/35301 filed Apr. 24, 2014. The disclosure of the International Application is hereby incorporated by reference in its entirety.

BACKGROUND

Unless otherwise indicated herein, the materials described in this section are not prior art to the claims in this application and are not admitted to be prior art by inclusion in this section.

Messages may be transmitted from a first entity to a second entity. A message may be modulated in order for the message to be transmitted through a medium. In some examples, the first entity may send a message that may include sensitive information to the second entity. A third entity may use various means to intercept the message being sent from the first entity to the second entity.

SUMMARY

In some examples, methods to broadcast a message are generally described. The methods may include receiving the message at a modulator. The methods may also include receiving, at the modulator, a power signal configured to provide power to a closed conductive loop. The methods may also include modulating, by the modulator, the power signal using the message to generate a modulated power signal. The methods may also include broadcasting, by the modulator, the message by sending the modulated power signal through the closed conductive loop. The modulated power signal, when sent through the closed conductive loop, may produce a modulated magnetic wave that may include an indication of the message.

In some examples, devices configured to broadcast a message are generally described. The devices may include a data receiver configured to receive the message. The devices may also include a power receiver configured to receive a power signal. The power signal may be configured to provide power to a closed conductive loop. The devices may also include a modulator configured to modulate the power signal with use of the message to generate a modulated power signal. The devices may also include a transmitter configured to broadcast the message by transmission of the modulated power signal through the closed conductive loop. Transmission of the modulated power signal through the closed conductive loop may produce a modulated magnetic wave that may include an indication of the message.

In some examples, receivers configured to retrieve a message from a closed conductive loop are generally described. The receivers may include a magnetometer. The receivers may also include a demodulator configured to be in communication with the magnetometer. The receivers may also include a processor configured to be in communication with the magnetometer and the demodulator. The processor may be configured to control operations of the magnetometer and the demodulator. The magnetometer may be configured to detect a modulated magnetic wave from the closed conductive loop. The modulated magnetic wave may include an indication of the message. The magnetometer may also be configured to, in response to the detection of the modulated magnetic wave, convert the modulated magnetic wave into a modulated power signal. The demodulator may be configured to demodulate the modulated power signal to reproduce the message.

In some examples, systems configured to broadcast a message are generally described. The systems may include a transmitting device configured to store the message. The systems may also include a transformer configured to be in communication with the transmitting device. The transformer may be configured to receive a power signal of a first voltage. The transformer may also be configured to transform the power signal to a transformed power signal of a second voltage. The second voltage may be less than the first voltage. The systems may also include a data receiver configured to receive the message. The systems may also include a power receiver configured to receive the transformed power signal. The transformed power signal may be configured to provide power to a closed conductive loop. The systems may also include a modulator configured to modulate the transformed power signal with use of the message to generate a modulated power signal. The systems may also include a transmitter configured to broadcast the message by transmission of the modulated power signal through the closed conductive loop. Transmission of the modulated power signal through the closed conductive loop may produce a modulated magnetic wave that may include an indication of the message.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to broadcasting a message using modulated power.

Briefly stated, technologies are generally described for methods and systems effective to broadcast a message. In some examples, the methods may include receiving the message at a modulator. The message may include, for example, a password for a local network. The modulator may receive a power signal configured to provide power to a closed conductive loop. For example, the power signal may provide power to a room in a building. The modulator may modulate the power signal using the message to generate a modulated power signal. In the example, the modulator may modulate the password on to the power signal. The modulator may broadcast the message by sending the modulated power signal through the closed conductive loop. The modulated power signal, when passing through the closed conductive loop, may produce a modulated magnetic wave that includes an indication of the message. A receiver may be configured to detect the modulated magnetic wave from the closed conductive loop. The receiver may be configured to convert the modulated magnetic wave into the modulated power signal. In the example, the receiver may be configured to demodulate the modulated power signal to reproduce the message so that the receiver can process the password.

Figure 1:
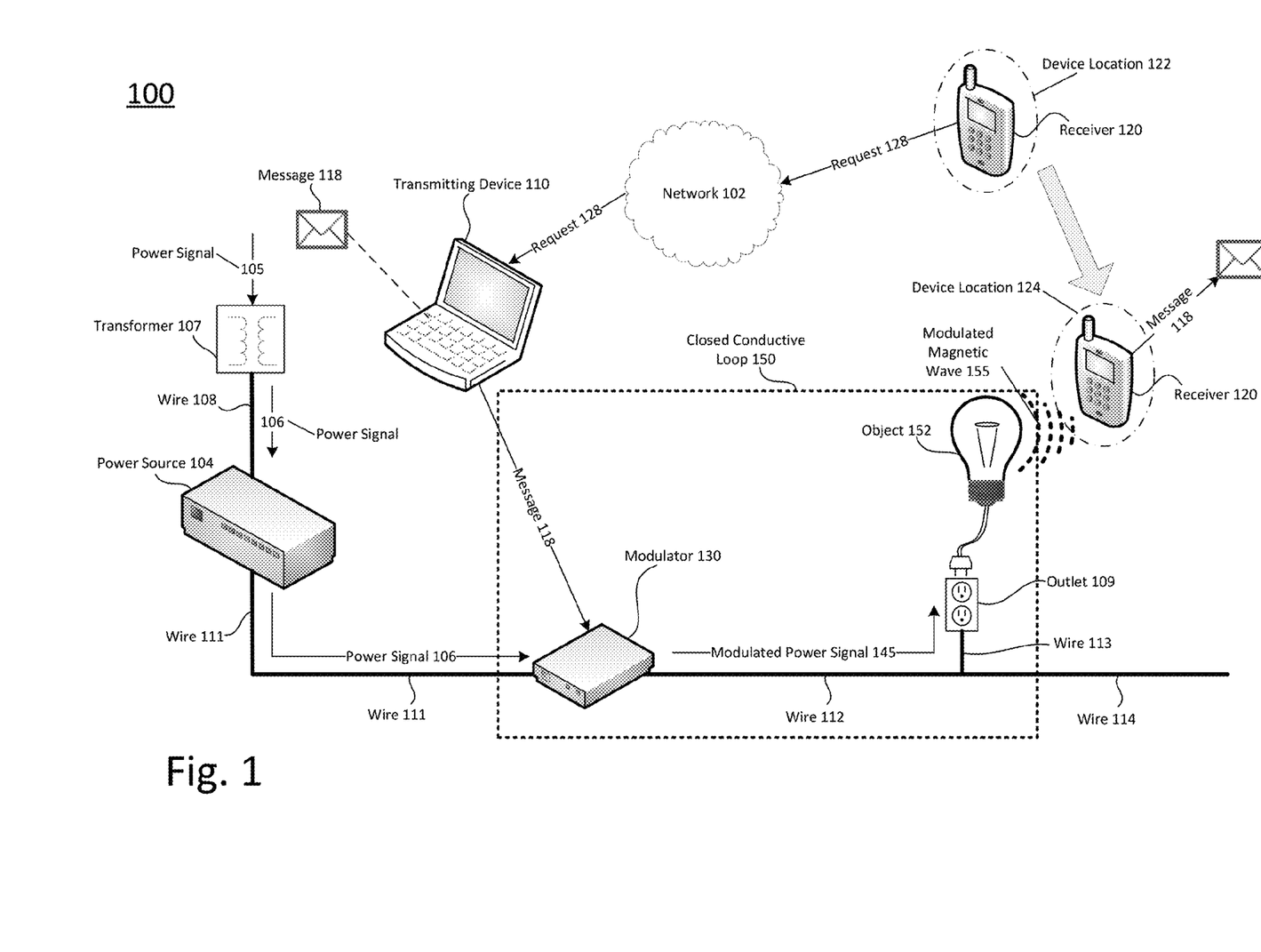
FIG. 1 illustrates an example system that can be utilized to implement broadcasting a message using modulated power.

FIG. 1 illustrates an example system 100 that can be utilized to implement broadcasting a message using modulated power, arranged in accordance with at least some embodiments described herein. System 100 may include a transformer 107, a transmitting device 110, a receiver 120 and/or a modulator 130. In some examples, system 100 may be implemented with a power distribution network. System 100 may be activated by using power distributed by a power source 104. Transformer 107 may be configured to be in communication with power source 104 such as by a wire 108. Power source 104 may be configured to be in communication with modulator 130 such as by a wire 111. Transmitting device 110 may be configured to be in communication with modulator 130 through a network 102 or through a medium such as a communication cable. Network 102 may be the Internet or a WI-FI network. When receiver 120, such as a cellular phone, is within system 100, transmitting device 110 and receiver 120 may be configured to be in communication with each other through network 102.

Transformer 107 may receive a power signal 105 from a power source outside of system 100 such as a power generator. Transformer 107 may transform power signal 105 into a power signal 106, where power signal 105 and power signal 106 may include different voltages. A voltage of power signal 106 may be less than a voltage of power signal 105 when transformer 107 is a step-down transformer. In some examples, power signal 106 may include a voltage of about 120 Volts and a frequency of about 60 Hertz. Power source 104 may be a device, such as a fuse box, configured to distribute power to objects within system 100, such as modulator 130 and an object 152, by sending power signal 106 through wires 111, 112, 113, 114 and/or an outlet 109. Object 152 may be an electronic product such as a lamp, television, computer monitor, etc. Power source 104 may receive power signal 106 from transformer 107 through wire 108. Power source 104 may distribute power signal 106, such as sending power signal 106 to modulator 130 through wire 111. When modulator 130 is deactivated, such as when modulator 130 is turned off by a user of system 100, power source 104 may send power signal 106 to wire 112, wire 114, and/or object 152 through wire 113. When modulator 130 is activated, such as when modulator 130 is turned on by a user of system 100, a power receiver of modulator 130 may receive power signal 106 from power source 104.

In an example, transmitting device 110 may be configured to store a message 118. In some examples, message 118 may be login information, such as a password, for network 102. In some examples, message 118 may be a message including sensitive information such as a buy or sell order relating to a transaction in a stock exchange. Transmitting device 110 may be configured to send message 118 to modulator 130 in a form of an analog signal or a digital signal to start a broadcast of message 118. Transmitting device 110 may be further configured to send message 118 to modulator 130 in an unencrypted format. In another example, receiver 120 may generate a request 128, which may be a request for a message 118 stored in transmitting device 110. Receiver 120 may send request 128 to transmitting device 110 through network 102 to request message 118. Transmitting device 110 may receive request 128 and in response, may send message 118 to modulator 130 to start the broadcast of message 118.

Modulator 130 may be a device configured to modulate analog and/or digital signals such as power signal 106 and/or message 118. Modulator 130 may modulate signals such as by amplitude modulation, frequency modulation, phase-shift keying modulation, etc. A data receiver of modulator 130 may receive message 118 from transmitting device 110 and in response, may modulate power signal 106 using message 118 such as by analyzing frequencies and/or amplitudes associated with message 118. Modulation of power signal 106 by modulator 130 may generate modulated power signal 145 which may include indications of power signal 106 and/or message 118. If power signal 106 resembles an amplitude modulation carrier signal, modulated power signal 145 may be a signal that includes same frequencies as message 118, but different amplitudes from message 118. If power signal 106 resembles a frequency modulation carrier signal, modulated power signal 145 may be a signal that includes the same amplitudes as message 118, but different frequencies from message 118. In some examples, modulator 130 may send modulated power signal 145 through a power distribution network including one or more other closed conductive loops in order to facilitate broadcast of message 118.

Closed conductive loop 150 may be formed by components such as modulator 130, wire 112, wire 113, and object 152. Closed conductive loop 150 may not be formed when object 152 is deactivated. Current associated with modulated power signal 145 may travel through closed conductive loop 150 and in response, components which formed closed conductive loop 150 may produce a modulated magnetic wave 155 associated with modulated power signal 145. Modulated magnetic wave 155 may be a magnetic wave that propagates in a near field region of an electromagnetic field produced by components which formed closed conductive loop 150. Modulated magnetic wave 155 may include an indication of message 118 as a result of the modulation of message 118 by modulator 130.

Receiver 120 may detect modulated magnetic wave 155 when receiver 120 overlaps with a propagation area of modulated magnetic wave 155 produced by closed conductive loop 150. For example, receiver 120 may not detect modulated magnetic wave 155 when receiver 120 is at a device location 122 that does not overlap with the propagation area of modulated magnetic wave 155. Receiver 120 may detect modulated magnetic wave 155 when receiver 120 is at a device location 124 that does overlap with the propagation area of modulated magnetic wave 155. In response to a detection of modulated magnetic wave 155, receiver 120 may be configured to convert modulated magnetic wave 155 into modulated power signal 145. Receiver 120 may be further configured to demodulate modulated power signal 145 to reproduce message 118. In some examples, receiver 120 may output or display message 118 on a display of receiver 120.

Figure 2:
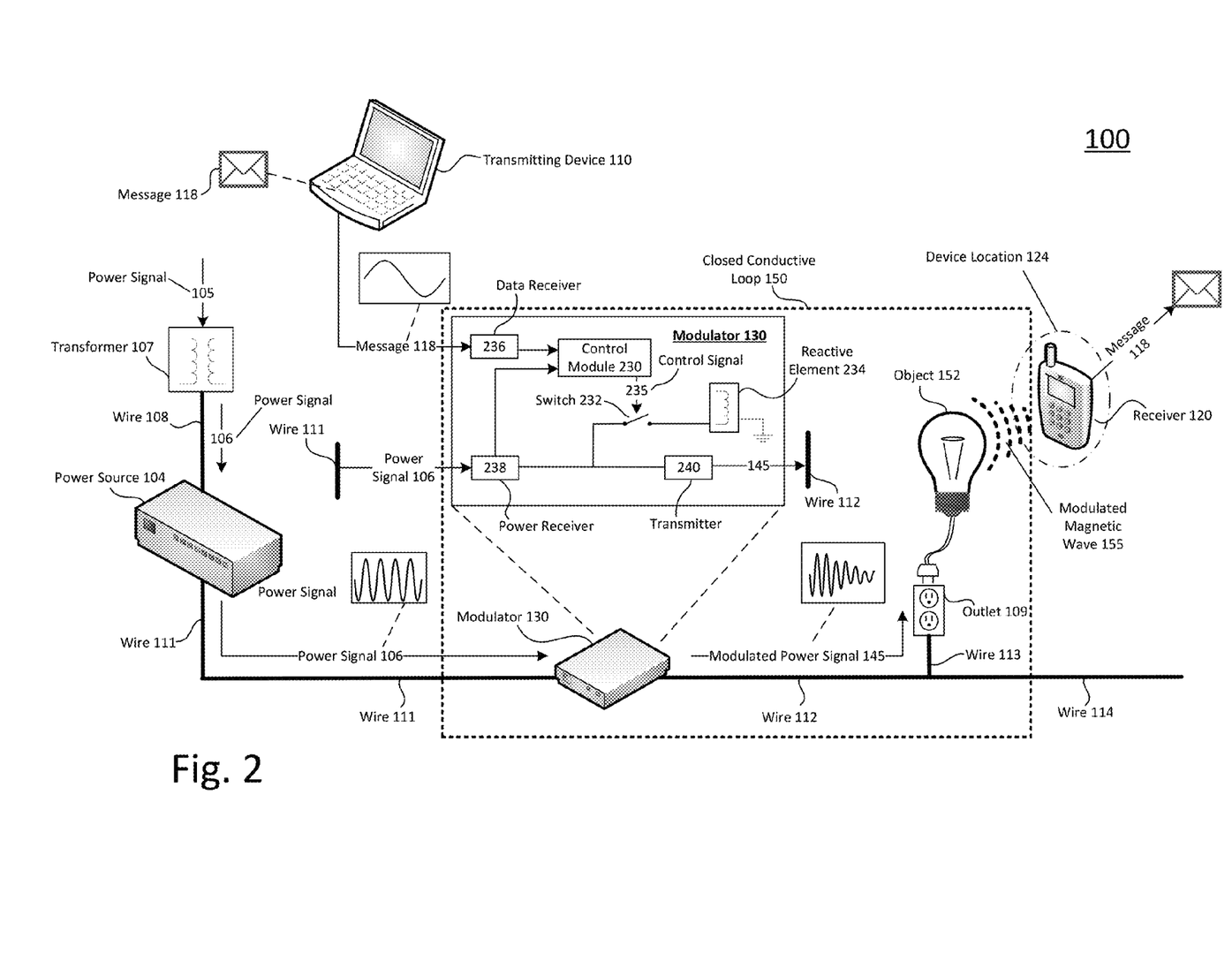
FIG. 2 illustrates the example system of FIG. 1 with further details relating to operations of a modulator.

FIG. 2 illustrates the example system of FIG. 1 with further details relating to operations of modulator 130, arranged in accordance with at least some embodiments described herein. FIG. 2 is substantially similar to system 100 of FIG. 1, with additional details. Those components in FIG. 2 that are labeled identically to components of FIG. 1 will not be described again for the purposes of clarity.

Modulator 130 may include components configured to facilitate generation of modulated power signal 145. Modulator 130 may include a control module 230, a switch 232, a reactive element 234, a data receiver 236, a power receiver 238, and/or a transmitter 240. Switch 232 may be a solid state switch such as a TRIAC (Triode for Alternating Current), an IGBT (Insulated-gate Bipolar Transistor), a MOSFET (Metal Oxide Semiconductor Field-Effect Transistor), etc. Data receiver 236 may be a receiver configured to receive data, such as message 118, from devices such as transmitting device 110. Data receiver 236, in response to receiving message 118 from transmitting device 110, may send message 118 to control module 230. Power receiver 238 may be a receiver configured to receive power signals, such as power signal 106, from power source 104 through wire 111. Power receiver 238, in response to receiving power signal 106 from power source 104, may send power signal 106 to control module 230.

Control module 230 may be configured to receive message 118 from data receiver 236 and may be configured to receive power signal 106 from power receiver 238. Control module 230 may be configured to analyze message 118 to generate a control signal 235 that is effective to control switch 232. Control signal 235 may be a digital signal. Control module 230 may be configured to use control signal 235 to control switch 232 to switch reactive element 234 into and/or out of closed conductive loop 150. Reactive element 234 may be switched into closed conductive loop 150 to affect an impedance of closed conductive loop 150.

In an example, transmitting device 110 may send message 118 to modulator 130 in order to broadcast message 118. Data receiver 236 may receive message 118 and in response, may send message 118 to control module 230. Control module 230 may receive message 118 and may receive power signal 106 from power receiver 238. In response to receipt of message 118 and power signal 106, control module 230 may analyze message 118 to generate control signal 235. For example, control module 230 may generate control signal 235 of "0101" when message 118 is a number of "5". Control module 230, in response to generation of control signal 235, may use control signal 235 to control switch 232. For example, when control signal 235 is "0101", control module 230 may toggle switch 232 to "off" at a first clock cycle. Similarly, switch 232 may be toggled to "on" at a second clock cycle, "off" at a third clock cycle, and "on" at a fourth clock cycle by control module 230. When control module 230 toggles switch 232 to "on", reactive element 234 may be switched into closed conductive loop 150. As a result of a series of switching reactive element 234 into closed conductive loop 150, modulated power signal 145 may be generated. Transmitter 240 may be configured to send modulated power signal 145 through closed conductive loop 150.

Figure 3:
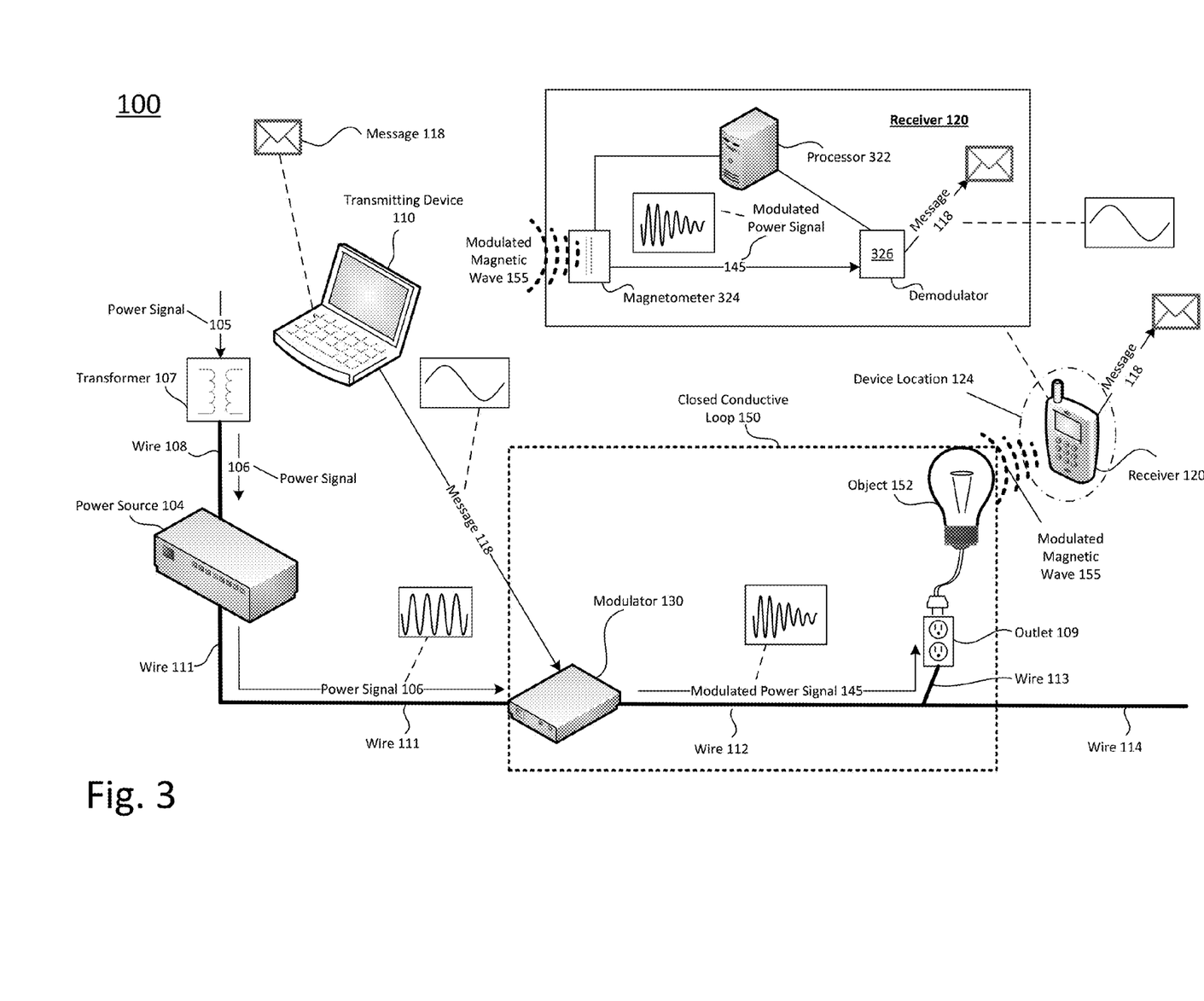
FIG. 3 illustrates the example system of FIG. 1 with further details relating to operations of a receiver.

FIG. 3 illustrates an example system of FIG. 1 with further details relating to operations of receiver 120, arranged in accordance with at least some embodiments described herein. FIG. 3 is substantially similar to system 100 of FIG. 1, with additional details. Those components in FIG. 3 that are labeled identically to components of FIG. 1 will not be described again for the purposes of clarity.

Receiver 120 may include components configured to facilitate a retrieval of message 118 from components which formed closed conductive loop 150. Receiver 120 may include a processor 322, magnetometer 324, and/or a demodulator 326. Processor 322 may be configured to be in communication with magnetometer 324 and/or demodulator 326. Processor 322 may be configured to control operations of magnetometer 324 and/or demodulator 326. Magnetometer 324 and demodulator 326 may be configured to be in communication with each other.

Magnetometer 324 may be configured to detect magnetic waves outside of receiver 120. Magnetometer 324 may be further configured to convert detected magnetic waves into power signals. For example, when receiver 120 is at device location 124, magnetometer 324 may detect modulated magnetic wave 155 from closed conductive loop 150. Magnetometer 324 may convert modulated magnetic wave 155 into modulated power signal 145. Magnetometer 324 may send modulated power signal 145 to demodulator 326 in response to a conversion of modulated magnetic wave 155 into modulated power signal. Demodulator 326 may receive modulated power signal 145 from magnetometer 324 and in response, may demodulate modulated power signal 145 to reproduce message 118. In some examples, processor 322 may receive message 118 from demodulator 326 and in response, may output message 118 on a display associated with receiver 120.

Among other possible benefits, a system in accordance with the disclosure may benefit users and administrators of a network. The system may provide a secure, yet convenient method of message transmission and/or broadcast. Users of a network may receive confidential, unencrypted information, such as login information to the network, by navigating a device such as a cellular phone, to an object which is part of a closed conductive loop. For example, a user using a cellular phone may enter a building and may wish to connect to a WI-FI network of the building. The user may navigate the cellular phone to an object such as a screen of a computer or a lighting display to retrieve login information for the WI-FI network. The user may also navigate the cellular phone to a wall that includes a wire that may be part of the closed conductive loop. An administrator of the network may broadcast unencrypted messages to one or more users securely. The messages may be broadcasted within a propagation area of modulate magnetic waves, and consequently, it may be difficult for an intruder to intercept and/or alter the message. The system may also benefit professionals working in a stock exchange pit as confidential unencrypted information such as a buy or sell orders may be transmitted between the professionals.

Figure 4:
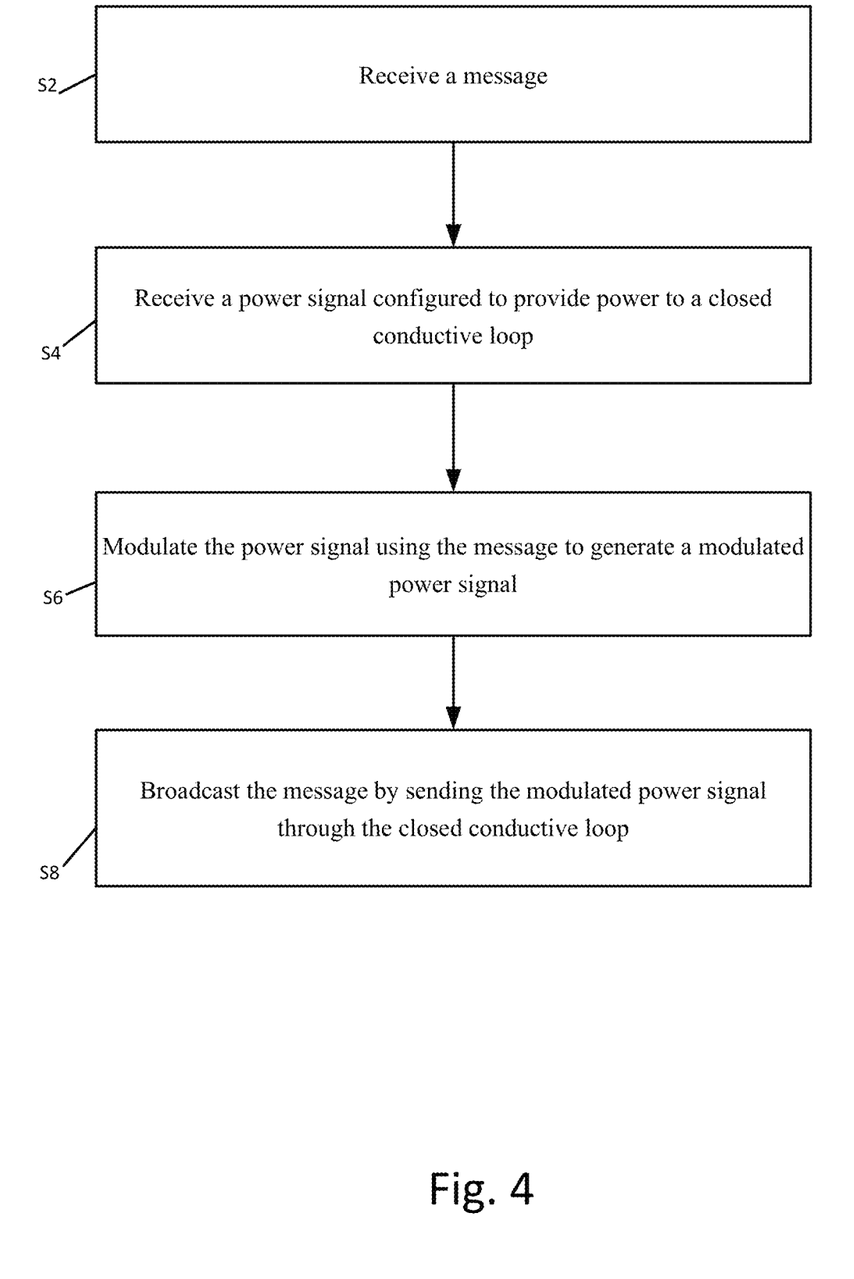
FIG. 4 illustrates a flow diagram for an example process for implementing broadcasting a message using modulated power.

FIG. 4 illustrates a flow diagram for an example process for implementing broadcasting a message using modulated power, arranged in accordance with at least some embodiments presented herein. The process in FIG. 4 could be implemented using, for example, system 100 discussed above. An example process may include one or more operations, actions, or functions as illustrated by one or more of blocks S2, S4, S6, and/or S8. Although illustrated as discrete blocks, various blocks may be divided into additional blocks, combined into fewer blocks, or eliminated, depending on the desired implementation.

Processing may begin at block S2, "Receive a message". At block S2, a modulator may receive a message. The modulator may receive the message from a transmitting device. The transmitting device may be configured to store the message. In some examples, the message may relate to login information of a network.

Processing may continue from block S2 to block S4, "Receive a power signal configured to provide power to a closed conductive loop". At block S4, the modulator may receive a power signal configured to provide power to a closed conductive loop. The power signal may include a voltage of about 120 Volts and a frequency of about 60 Hertz. In some examples, the modulator may receive the power signal from a step-down transformer.

Processing may continue from block S4 to block S6, "Modulate the power signal using the message to generate a modulated power signal". At block S6, the modulator may modulate the power signal using the message to generate a modulated power signal. The modulator may analyze the message to generate a control signal. The modulator may control a switch using the control signal. The modulator may control the switch to switch a reactive element into the closed conductive loop to affect an impedance of the closed conductive loop.

Processing may continue from block S6 to block S8, "Broadcast the message by sending the modulated power signal through the closed conductive loop". At block S8, the modulator may broadcast the message by sending the modulated power signal through the closed conductive loop. When the modulated power signal is sent through the closed conductive loop, a modulated magnetic wave may be produced. The modulated magnetic wave may include an indication of the message.

Figure 5:
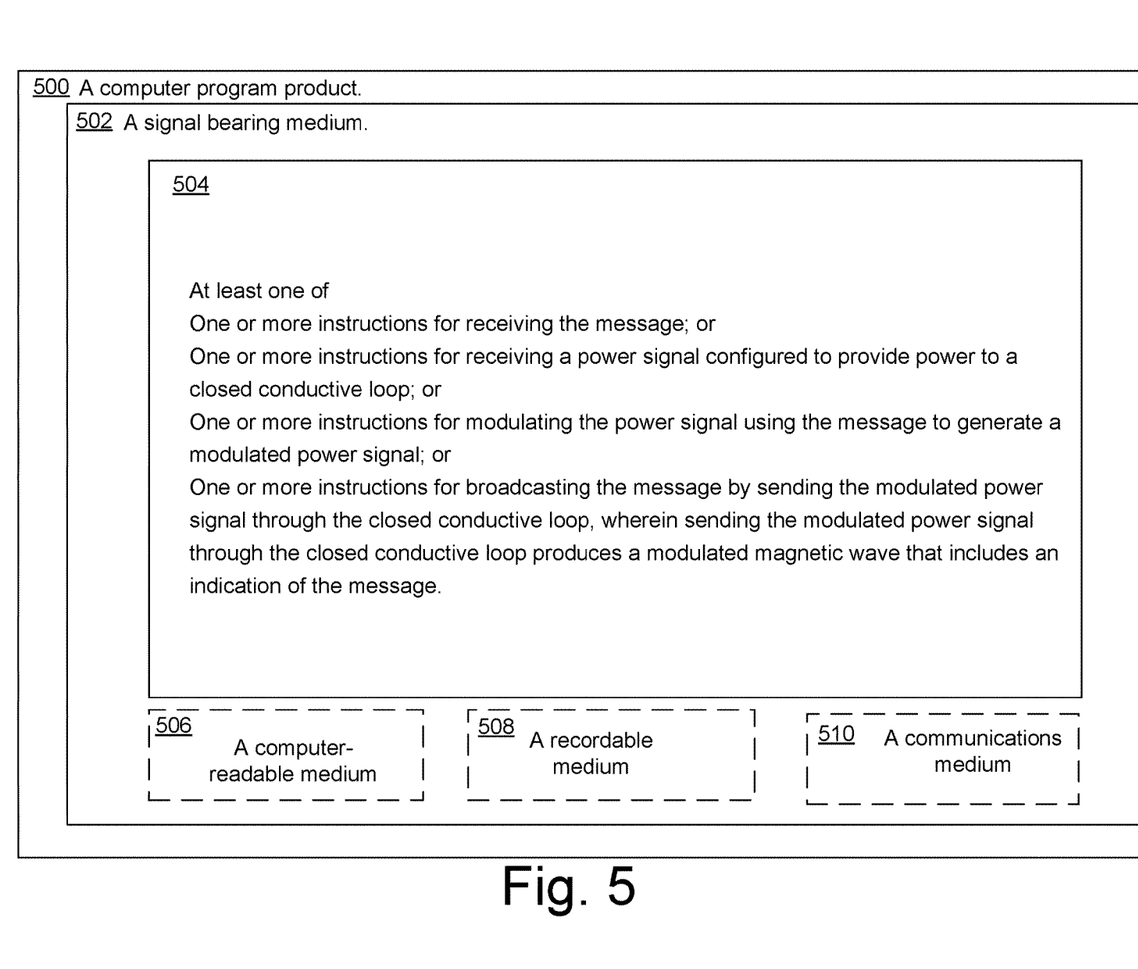
FIG. 5 illustrates an example computer program product that can be utilized to implement broadcasting a message using modulated power.

FIG. 5 illustrates an example computer program product 500 that can be utilized to implement broadcasting a message using modulated power, arranged in accordance with at least some embodiments described herein. Computer program product 500 may include a signal bearing medium 502. Signal bearing medium 502 may include one or more instructions 504 that, when executed by, for example, a processor, may provide the functionality described above with respect to FIGS. 1-4. Thus, for example, referring to system 100, modulator 130 may undertake one or more of the blocks shown in FIG. 4 in response to instructions 504 conveyed to the system 100 by signal bearing medium 502.

In some implementations, signal bearing medium 502 may encompass a computer-readable medium 506, such as, but not limited to, a hard disk drive (HDD), a Compact Disc (CD), a Digital Video Disk (DVD), a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communications medium 510, such as, but not limited to, a digital and/or an analog communication medium (e.g., a fiber optic cable, a waveguide, a wired communication link, a wireless communication link, etc.). Thus, for example, computer program product 500 may be conveyed to one or more modules of the system 100 by an RF signal bearing medium 502, where the signal bearing medium 502 is conveyed by a wireless communications medium 510 (e.g., a wireless communications medium conforming with the IEEE 802.11 standard).

Figure 6:
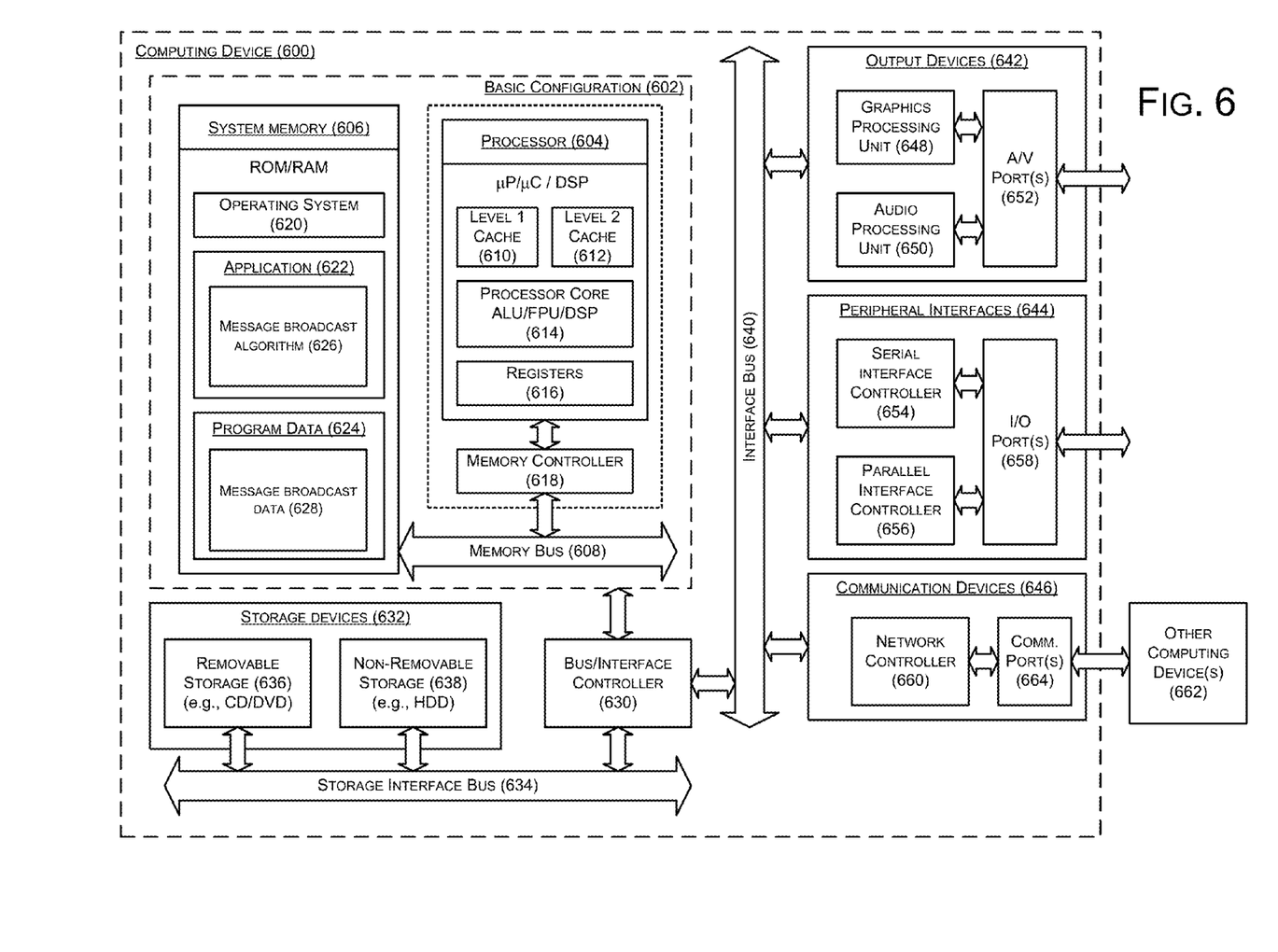
FIG. 6 is a block diagram illustrating an example computing device that is arranged to implement broadcasting a message using modulated power, all arranged according to at least some embodiments described herein.

FIG. 6 is a block diagram illustrating an example computing device 600 that is arranged to implement broadcasting a message using modulated power, arranged in accordance with at least some embodiments described herein. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one or more levels of caching, such as a level one cache 610 and a level two cache 612, a processor core 614, and registers 616. An example processor core 614 may include an arithmetic logic unit (ALU), a floating point unit (FPU), a digital signal processing core (DSP core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include a message broadcast algorithm 626 that is arranged to perform the functions as described herein including those described with respect to system 100 of FIGS. 1-5. Program data 624 may include message broadcast data 628 that may be useful for implementation of message broadcast using modulated power as is described herein. In some embodiments, application 622 may be arranged to operate with program data 624 on operating system 620 such that implementations of broadcasting message using modulated power may be provided. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDDs), optical disk drives such as compact disc (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will also be understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to broadcast a message, the method comprising, by a modulator:
   receiving the message;
   receiving a power signal configured to provide power to a closed conductive loop formed by at least one wire;
   modulating the power signal using the message to generate a modulated power signal; and
   broadcasting the message by sending current associated with the modulated power signal through the closed conductive loop formed by the at least one wire, wherein sending the current associated with the modulated power signal through the closed conductive loop produces a modulated magnetic wave that includes an indication of the message.

2. The method of claim 1, wherein the message is from a transmitting device configured to store the message.

3. The method of claim 1, wherein modulating the power signal comprises:
   analyzing the message to generate a control signal, wherein the control signal corresponds to the message; and
   controlling a switch, using the control signal, to switch a reactive element into the closed conductive loop and affect an impedance of the closed conductive loop.

4. The method of claim 1, further comprising sending the modulated power signal through a power distribution network.

5. The method of claim 1, wherein the power signal is from a step-down transformer.

6. The method of claim 1, wherein the message relates to login information of a network.

7. The method of claim 1, wherein the power signal includes a voltage of 120 Volts and a frequency of 60 Hertz.

8. The method of claim 1, wherein broadcasting the message includes broadcasting the message in an unencrypted format.

9. A device configured to broadcast a message, the device comprising:
   a data receiver configured to receive the message;
   a power receiver configured to receive a power signal, the power signal configured to provide power to a closed conductive loop formed by at least one wire;
   a modulator configured to modulate the power signal with use of the message to generate a modulated power signal; and
   a transmitter configured to broadcast the message by transmission of current associated with the modulated power signal through the closed conductive loop formed by the at least one wire, wherein the transmission of the current associated with the modulated power signal through the closed conductive loop produces a modulated magnetic wave that includes an indication of the message.

10. The device of claim 9, wherein the modulator includes:
    a reactive element; and
    a switch configured to be in communication with the reactive element.

11. The device of claim 10, wherein the modulator is configured to:
    analyze the message to generate a control signal, wherein the control signal corresponds to the message; and
    control the switch, by use of the control signal, to switch the reactive element into the closed conductive loop and affect an impedance of the closed conductive loop.

12. The device of claim 9, wherein the message relates to login information of a network.

13. The device of claim 9, wherein the power signal includes a voltage of 120 Volts and a frequency of 60 Hertz.

14. A receiver configured to retrieve a message from a closed conductive loop formed by at least one wire, the receiver comprising:
    a magnetometer;
    a demodulator configured to be in communication with the magnetometer; and
    a processor configured to be in communication with the magnetometer and the demodulator, the processor being configured to control operations of the magnetometer and the demodulator,
    wherein the magnetometer is configured to:
        detect a modulated magnetic wave from the closed conductive loop formed by the at least one wire, wherein the modulated magnetic wave includes an indication of the message; and
        in response to the detection of the modulated magnetic wave, convert the modulated magnetic wave into a modulated power signal, and
    wherein the demodulator is configured to demodulate the modulated power signal to reproduce the message.

15. The receiver of claim 14, wherein the processor is further configured to:
    generate a request for the message; and
    send the request to a transmitting device configured to store the message.

16. The receiver of claim 14, wherein the message relates to login information of a network.

17. The receiver of claim 14, wherein the processor is further configured to output the message on a display of the receiver.

18. A system configured to broadcast a message, the system comprising:

a transmitting device configured to store the message;
a transformer configured to be in communication with the transmitting device, the transformer being configured to:
receive a power signal of a first voltage; and
transform the power signal to a transformed power signal of a second voltage, wherein the second voltage is less than the first voltage;
a data receiver configured to receive the message;
a power receiver configured to receive the transformed power signal, the transformed power signal configured to provide power to a closed conductive loop formed by at least one wire;
a modulator configured to modulate the transformed power signal with use of the message to generate a modulated power signal; and
a transmitter configured to broadcast the message by transmission of current associated with the modulated power signal through the closed conductive loop formed by the at least one wire, wherein the transmission of the current associated with the modulated power signal through the closed conductive loop produces a modulated magnetic wave that includes an indication of the message.

19. The system of claim 18, wherein the transmitter is configured to send the modulated power signal through a power distribution network.

20. The system of claim 18, wherein the transmitter is configured to broadcast the message in an unencrypted format.

* * * * *